Oct. 21, 1924.

F. MÜLLER 1,512,631

UNIVERSAL RELIEVING MACHINE

Filed April 22, 1921   7 Sheets-Sheet 5

Inventor
Friederich Müller
By Joseph K. Schofield
Attorney

Patented Oct. 21, 1924.

1,512,631

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

UNIVERSAL RELIEVING MACHINE.

Application filed April 22, 1921. Serial No. 463,541.

*To all whom it may concern:*

Be it known that I, FRIEDERICH MÜLLER, a citizen of the United States, residing at Hartford, in the county of Hartford and State of Connecticut, have invented certain new and useful Improvements in Universal Relieving Machines, of which the following is a specification.

This invention relates to lathes and particularly to relieving lathes adapted to perform relieving operations on reamers, taps, milling cutters, counterbores and other metal working cutters. However, the machine is not limited for use upon cutters of the kinds mentioned and can be used in practically all cases in which relieving movements of the cutting tool are required. For the sake of convenience the term "cutters" is used throughout the specification, but it will be understood that the term is intended to include not only rotary metal working tools but also any other articles for which relief is required.

In many respects the machine illustrated herein is like that illustrated and described in my Reissue Patent No. 15,127, dated July 19, 1921. The principal object of the invention is to provide certain improved mechanism particularly adapted for use with the machine illustrated in such patent.

One object of the invention is the provision of improved mechanism for increasing the driving speed range of the tool carriage operating screw. I perform this object by providing two separate driving mediums for the screw, one being preferably operated from the spindle and the other from a shaft operated at a rapid speed relative to the spindle.

Another object of the invention is the provision of an indexing means in combination with the improved mechanism for increasing the driving speed range of the tool carriage operating screw, whereby either the carriage operating screw or the work spindle, which elements are ordinarily connected together and operated in synchronism, may be given a definite indexing movement independent of and relative to the other, such movements serving to move the tool along the work or to rotate the work without moving the other member.

Another object of the invention is to provide means for readily disengaging the work spindle from the tool operating shaft and for operating either of these elements independently of the other, such operation being necessary to bring the tool and cutter into the proper relative position at the beginning of a cutting operation.

Another object of the invention is the provision of improved mechanism whereby the extent of the feeding movement of the tool is limited and the tool feed thereby stopped at any desired point.

Another object of the invention is to provide a machine combining a tool feeding mechanism and a compensating mechanism adapted respectively to operate on milling cutters or hobs having annularly arranged teeth thereon and on spiral hobs, means being provided for rendering either of such mechanisms operative or inoperative.

Another object of the invention resides in the provision of an improved tool-supporting mechanism which may be adjusted to any one of a plurality of relatively angular positions whereby the tool may be made to face in the direction most adapted to the particular work to be performed.

Other and more specific objects of the invention will become apparent from the following specification taken in connection with the accompanying drawings. It should be understood, however, that the improvements illustrated herein are not necessarily limited to the details shown on the drawings or to use in a machine as illustrated, the scope of the invention being defined in the claims appended hereto.

Referring to the figures of the drawings.

Referring to the drawings, 1 represents the main base or bed upon which the other parts of the machine are mounted. Means are provided for holding and rotating a cutter to be relieved, this means preferably comprising a headstock 2 and a tailstock 3, each provided with a center. It will be understood, however, that the invention in its broader phases is not limited to the particular construction shown, and that the cutter may, if preferred, be otherwise held, as for instance by a chuck or collet.

The headstock is provided with a frame casting 4 rigidly secured to the bed. This casting is provided with suitable bearings 5 and 6 in which there is rotatably mounted a live spindle 7, which preferably carries a center 8 and a face plate 9.

Figures 5, 6, 7, 8, 9, 10, 11:
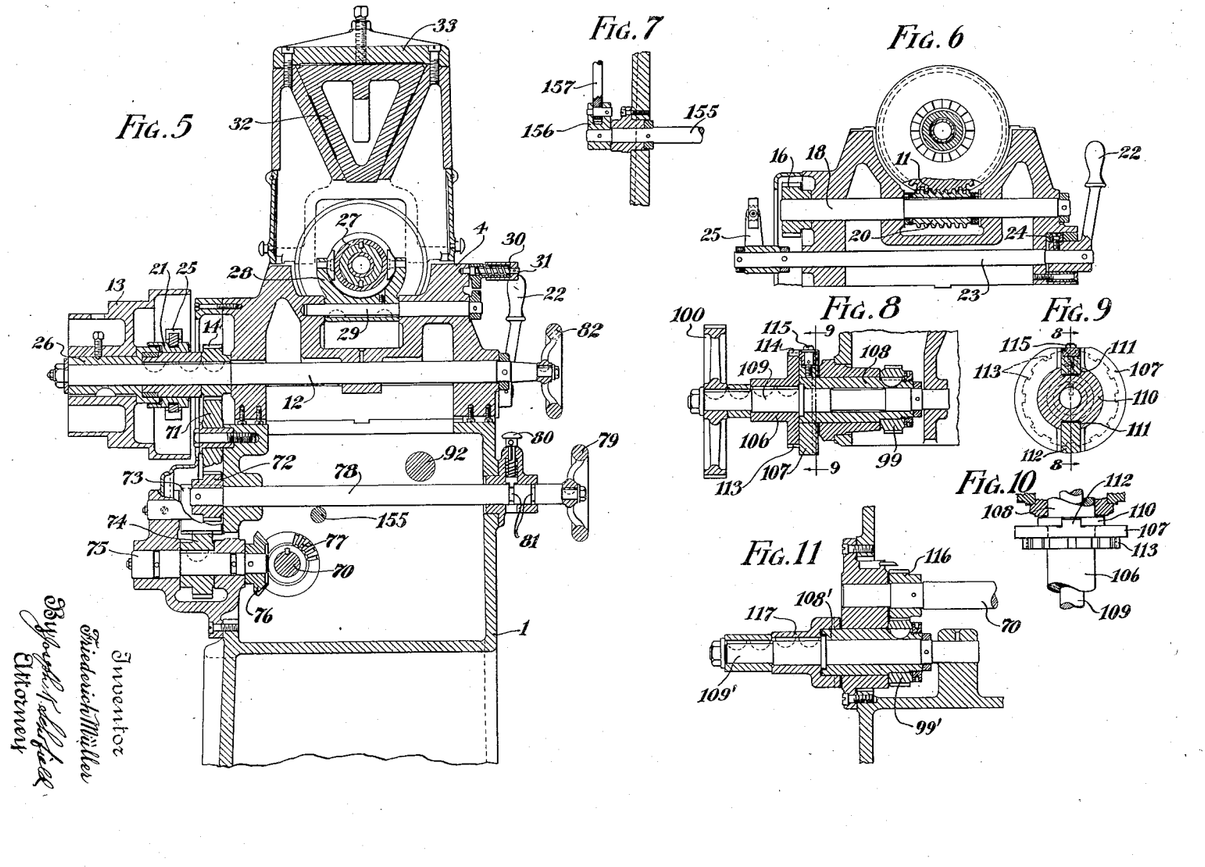
Fig. 5 is a vertical transverse sectional view taken on the line 5—5 of Fig. 2.
Fig. 6 is a vertical transverse sectional view taken on the line 6—6 of Fig. 2.
Fig. 7 is a fragmentary detail sectional view taken on the line 7—7 of Fig. 3.
Fig. 8 is a fragmentary detail sectional view taken on the line 8—8 of Figs. 3 and 9.
Fig. 9 is a cross sectional view taken on the line 9—9 of Fig. 8.
Fig. 10 is a detail view of the structure shown in Figs. 8 and 9.
Fig. 11 is a detail sectional view taken on the line 11—11 of Fig. 3.
Figure 12:
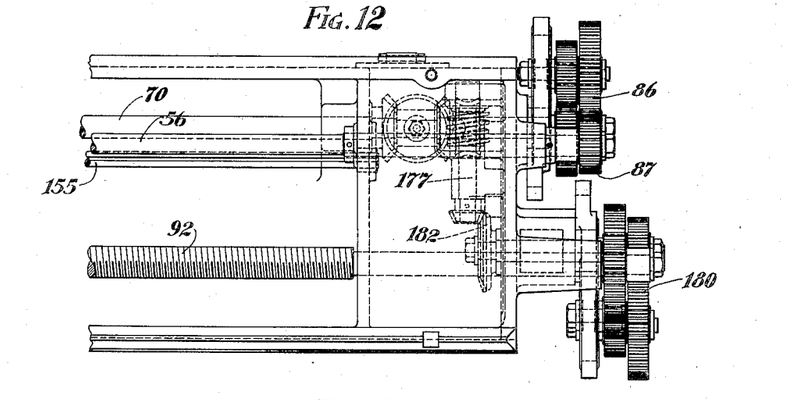
Fig. 12 is a fragmentary plan view of the right hand end of the machine, showing particularly the gearing and shafts operated thereby.
Figure 13:
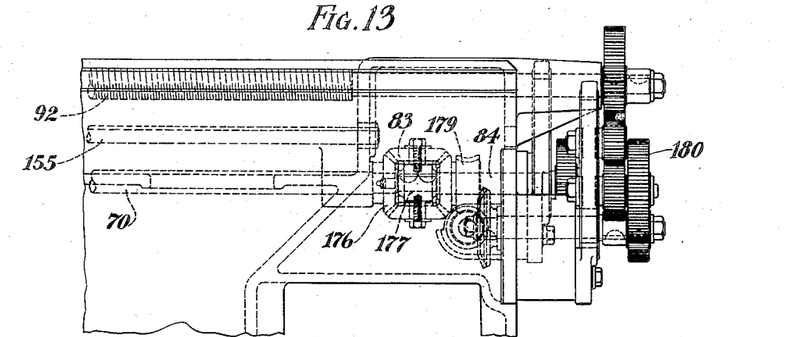
Fig. 13 is a side elevation of the same.
Figure 14:
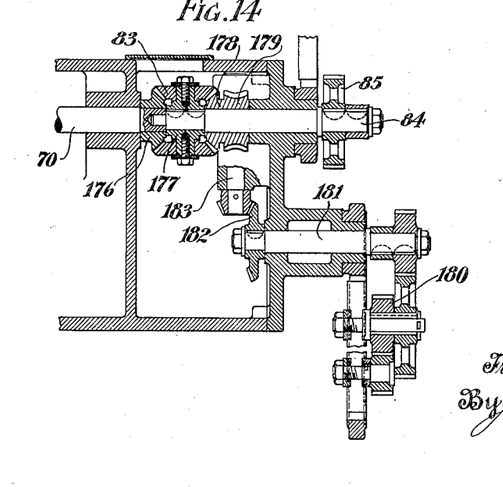
Fig. 14 is a fragmentary detail sectional view of a portion of the mechanism illustrated in Figs. 12 and 13.

Loosely mounted on the spindle 7 are two worm wheels 10 and 11. Preferably, as indicated, particularly in my aforesaid patent, the teeth of the worm wheel 10 are adapted to mesh with a double-threaded worm, and the teeth of the worm wheel 11 are adapted to mesh with a single-threaded worm. Extending transversely of the headstock and mounted in suitable bearings in the casting 4, is a drive shaft 12 provided at its rear end with a driving means, here shown in the form of a set of cone belt pulleys 13. Secured on the drive shaft 12, preferably adjacent the belt pulleys, is a pinion 14 which meshes with pinions 15 and 16 mounted respectively on suitably mounted transverse shafts 17 and 18. Mounted respectively on the shafts 17 and 18 are worms 19 and 20 which mesh respectively with the aforesaid worm wheels 10 and 11. When the worm wheels are constructed as already described, the worm 19 is provided with a double thread and the worm 20 with a single thread. It will be seen that the construction is such that when the worms 19 and 20 are rotated the worm wheels will be given different rotative speeds, the wheel 10 in this case having a speed considerably in excess of that of the wheel 11. I preferably mount the belt pulley 13 loose on the shaft 12 and provide a friction clutch 21 between the pulley and the pinion 14. The clutch may be shifted into and out of driving engagement by means of a handle 22 mounted on a shaft 23. Rotation of the handle moves a lug 24 along a stationary cam slot in the headstock whereby the shaft 23 and a clutch-engaging arm 25 thereon are moved longitudinally of the shaft and the clutch is moved into and out of frictional engagement with the driving sleeve 26 (Fig. 6).

Splined to the spindle between the worm wheels 10 and 11 is a clutch element 27 having teeth at each side adapted respectively to mesh with similar teeth formed on the worm wheels. It will be seen that by means of this clutch element either of the worm wheels can be operatively connected with the spindle.

Figure 1:
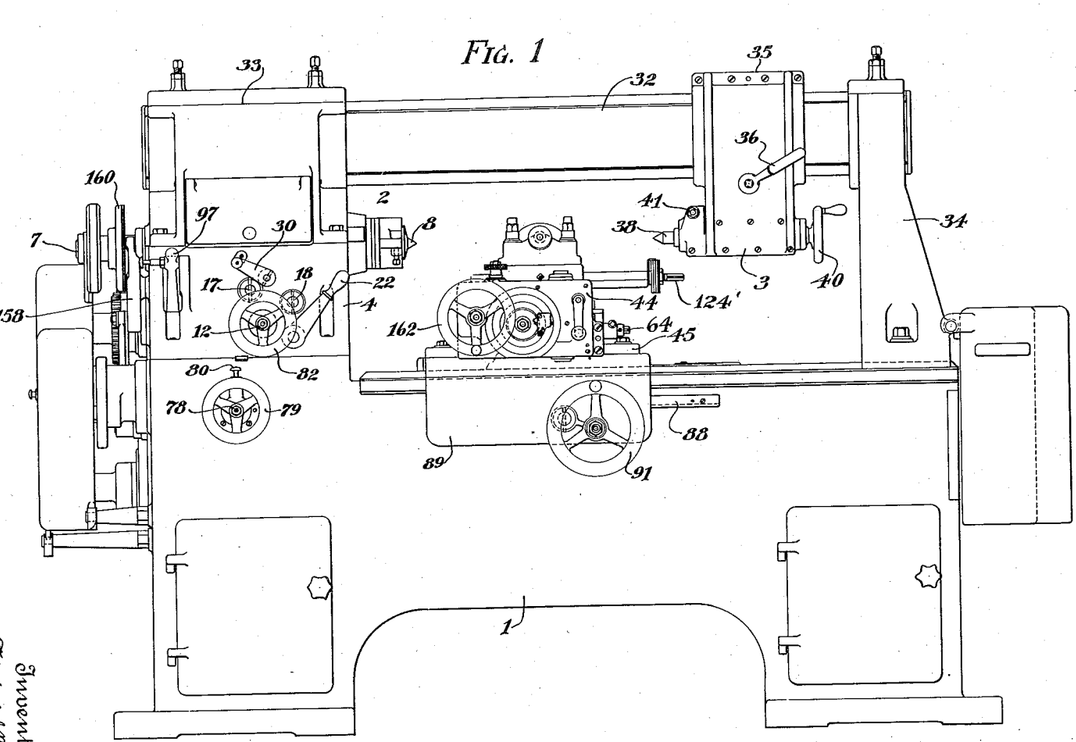
Figure 1 is a side elevation of the entire machine.
Figure 2:
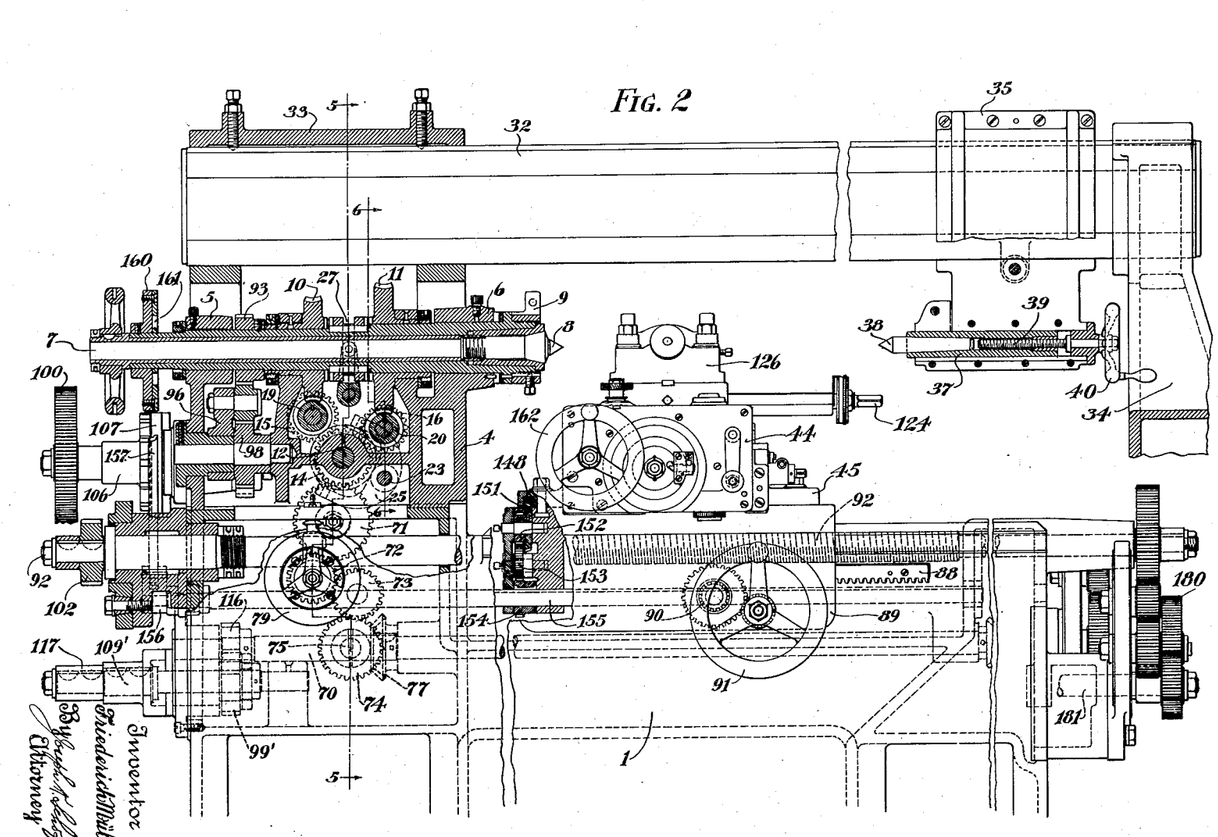
Fig. 2 is a side elevation of the upper portion of the machine, certain of the parts being shown in section.

For moving the clutch element 27 longitudinally of the spindle, there is provided an oscillatory lever 28 provided with pins or projections fitting in a circumferential groove in the clutch element. The lever 28 is secured to a transverse rock shaft 29 provided with an operating lever 30. It will be seen that by means of the lever 30 the clutch element 27 can be controlled so as to be maintained in neutral position as shown in Fig. 2, or moved into engagement with either of the worm wheels 10 or 11. The lever 30 is provided with a spring-pressed pin 31 adapted to enter suitable holes in the casting 4 and thus lock the lever and the clutch element in the desired position.

The tailstock 3 is so mounted that it does not interfere in any way with the operation of the reciprocating tool-carrying slide. As illustrated, there is provided a horizontal supporting bar 32 which is parallel with the bed 1. Preferably, as illustrated, this bar is removably supported at one end on a bracket 33 mounted on the headstock and at the other end in a casting 34 mounted on the tailstock end of the machine, the casting 34 engaging and being adjustable along the usual ways of the bed. The bar is preferably hollow and polygonal in form, being shown as triangular. The tailstock 35 is mounted on the bar for adjustment therealong, a clamp operated by a handle 36 being adapted to secure the same in its adjusted position. The sleeve 37 and center 38 can be moved longitudinally by means of the usual screw 39 and hand wheel 40 and can be clamped in work-supporting position by means of a nut 41. For a more detailed description of this mechanism reference should be made to my aforesaid patent.
It will be seen that by suitably positioning the tailstock on the bar 32 and by then adjusting the center 38 by means of the sleeve 37 and the hand wheel 40, a cutter or other article to be relieved can be secured in the usual way between the two centers 8 and 38; and the cutter can be connected to the face plate on the headstock spindle in any usual or preferred way to be rotated. It may in some cases, however, be desirable to mount the cutter entirely on the spindle and for this purpose a collet mechanism such as shown and described in my aforesaid patent may be provided. In such case the tailstock mechanism may be entirely removed if desired.

The cutting tool must be so held and supported that it can be moved toward and from the cutter to be relieved in timed relation to the rotation thereof. The tool must make as many movements forward and backward during each cutter rotation as the cutter has teeth in each annular convolution thereon. A cutting tool is indicated at 42, and for supporting it there is provided a reciprocable horizontal slide 43 to which the tool is secured in any suitable way. A supporting device 44 is provided for the slide 43 and preferably this supporting device is provided with separated parallel ways with which the slide engages. When it is desired to make it possible for the cutting tool to approach the cutter from any angle, the supporting device 44 must be in the form of a turntable rotatable about a vertical axis, and in the drawings the supporting device 44 is so shown. The turntable 44 rests upon a saddle 45 which is supported on the bed of the machine. The turntable is provided with annular bearing surfaces which fit similar bearing surfaces formed on the saddle, and the saddle is also provided with an annular T-slot 46 into which extend T-bolts 47 adapted to lock the turntable in any desired angular position.
Preferably the saddle 45 is slidable along the bed 1, the bed being provided with the usual ways on which the saddle rests. By means of suitable bolts 48 the saddle can be clamped in any desired position on the bed
1. Pivoted at 49 on the supporting device or turntable 44 is a lever 50 having two arms, one of which has connection with the slide 43 and the other of which is engaged by a suitable cam 51. When the supporting device 44 is in the form of a turntable, as here shown, the cam 51 is positioned centrally with its axis coincident with the axis of the turntable, thus making it possible for the cam and lever to properly cooperate with the turntable in any position of adjustment. Preferably the cam is in the form of a groove in the top of a wheel 52. The wheel 52 is mounted on a conical stud 53 secured to a depressed part of the saddle 45. The wheel 52 is preferably provided with worm teeth 54 which mesh with a worm 55 on a shaft 56. When the saddle 45 is adapted for longitudinal movement along the bed, the shaft 56 is longitudinally arranged and the worm 55 is splined to it. It will be clear that when the shaft 56 is rotated motion will be transmitted through the worm and worm wheel to rotate the cam.

Figures 15, 16, 17, 18:
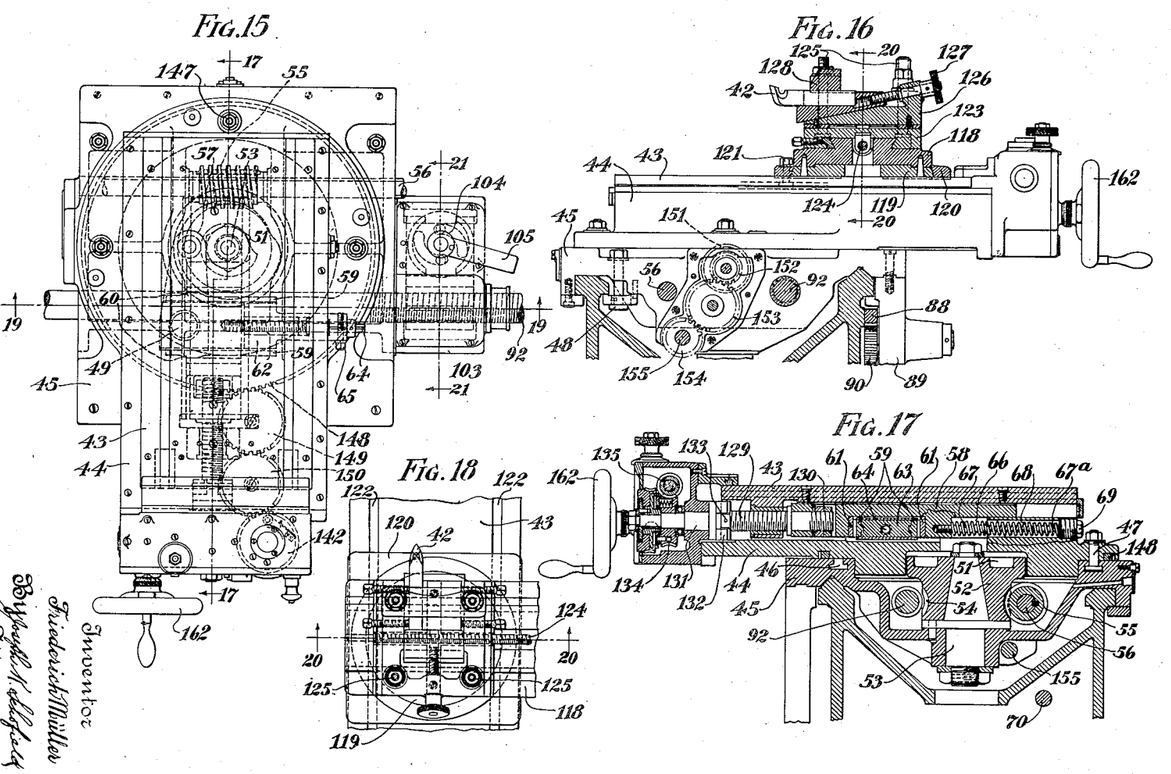
Fig. 15 is a plan view of the tool-supporting carriage.
Fig. 16 is a side elevation thereof, the tool support and the machine bed being shown in section.
Fig. 17 is a vertical longitudinal section through the same on the line 17—17 of Fig. 15, the tool-supporting block being removed.
Fig. 18 is a plan view of the tool support.

One arm of the lever 50 is provided with a roller 57 which extends into the cam groove 51. The groove is preferably of the form shown in Fig. 15, being adapted to move the lever slowly in one direction and rapidly in the other. Connected with the slide 43 for normal movement in unison therewith, is a device 58 to which power is applied by the lever for actuating the slide. The lever 50 is adjustable so as to vary the amount of movement which it transmits to the device 58 and to the tool-carrying slide 43. Preferably this adjustment is effected by changing the effective length of one arm of the lever and, as shown, this arm of the lever is constructed with two telescopically engaging parts. At the sides of the body part of the lever are two slidable plates 59, 59 formed with oppositely disposed thickened portions 60, 60, each with a surface in the form of a section of a cylinder, these two cylindrical surfaces having a common center. The surfaces of the enlargements 60, 60 fit between transverse parallel surfaces 61, 61 provided on the actuating device 58, and as the surfaces on the parts 60, 60 are cylindrical, the engagement with the surfaces 61, 61 is maintained notwithstanding any angular movement. The two plates 59, 59 are secured to a block 62 which is centrally recessed to receive an extension 63 on the body part of the lever. An adjusting screw 64 extends through an aperture in the block and is held against longitudinal movement with respect thereto. The inner end of the screw extends into a threaded aperture in the said extension 63. The outer end of the screw is squared to receive a wrench, and by turning the screw the block 62 together with the plates 59, 59 can be moved so as to bring the center of the cylindrical surfaces 60, 60 toward or away from the pivotal center of the lever. Preferably at the extreme inner position the center of the cylindrical surfaces coincides with the pivotal center, and no movement of the actuating device or the slide takes place as the lever is oscillated. As the screw is turned to move the center of the cylindrical surfaces outward, the movement of the actuating device and slide is gradually started and this movement is increased as the effective length of the lever is increased. In this way the extent of movement of the tool slide can be varied from zero to maximum. The screw 64 can be clamped by means of the screw 65.

While the cam 51 acts positively in both directions, I nevertheless prefer to provide a spring for assisting the cam in effecting the short rapid return movement of the slide whereby I avoid excessive strain on the lever, the cam and the several power transmitting parts. As illustrated, the turntable 44 is provided with an aperture 66 parallel with the line of movement of the actuating device and slide, and a spring 68 is provided which abuts at one end against the actuating device 58 and at the other end against a plug 69 threaded into the aperture 66. For holding the spring 68 in place there are provided pins 67 and 67$^a$ secured respectively to the actuating device 58 and to the plug 69.

As already stated, the cam wheel 52 is rotated by means of the shaft 56 and the worm 55. The shaft 56 is rotated synchronously with the spindle rotation through mechanism now to be described. This mechanism comprises a relatively high speed shaft 70 driven with the spindle operating pinions 15 and 16 from the pinion 14 through idler gears 71, 72 and 73 to a gear 74 keyed to a short transverse shaft 75. This shaft carries a bevel gear 76 meshing with a bevel gear 77 on the shaft 70. It should here be noted that the gear 72 is secured to a longitudinally movable shaft 78 adapted to be shifted longitudinally and rotated by means of a hand wheel 79. A spring-pressed latch 80 is adapted to engage in either of two annular grooves 81 in the shaft to secure the shaft in either of its two longitudinal positions. As illustrated in Fig. 5, the gear 72 is in engagement with both of its companion gears 71 and 73. When the shaft is moved longitudinally to engage the latch 80 in the other groove 81 the gear 72 will be disengaged from the gear 71 but will still be in engagement with the wider gear 73. When in such position the spindle may be given a rotary adjustment independent of the tool support by means of the hand wheel 82 and the tool support may be given a lateral movement toward or from the work independently of the spindle by means of the hand wheel 79.

Such relative operation between the work and tool is necessary before beginning the cut in order to accurately position the tool relative to the teeth on the cutter.

Referring particularly to Figs. 4, 12, 13 and 14, it will be seen that the shaft 70 drives the shaft 56 through a differential gearing 83, hereinafter more fully described and termed the compensating mechanism, to a shaft 84 in alignment with the shaft 70 and from a gear 85 on the shaft 84 through change speed gearing 86 to a gear 87 on the shaft 56. As has already been stated, it is necessary for the cutting tool to make one forward and backward movement for each tooth of the cutter to be relieved. It is therefore necessary that for each revolution of the live spindle the cam 51 be given as many rotations as the cutter has teeth in each annular convolution thereon. By using gears 86 of the proper sizes the number of rotations of the cam for each rotation of the live spindle can be varied, and a further variation can be obtained by connecting one or the other of the worm wheels 10 or 11 with the live spindle, thus varying the speed of the spindle with respect to the speed of the drive shaft 12. By means of this two-speed worm and wheel drive mechanism for the spindle, I am enabled to greatly increase the range of the machine without providing an unduly large number of interchangeable gears.

As already stated, the carriage is preferably movable longitudinally of the bed and this movement can be effected either manually or by power. For the purpose of moving the carriage manually there is provided a rack 88 secured to the bed. Connected with the saddle 45 is the apron 89 on which is mounted a short transverse shaft carrying a pinion 90 meshing with the rack. By means of a hand wheel 91 and intermediate gears the pinion can be turned to move the carriage.

Figure 3:
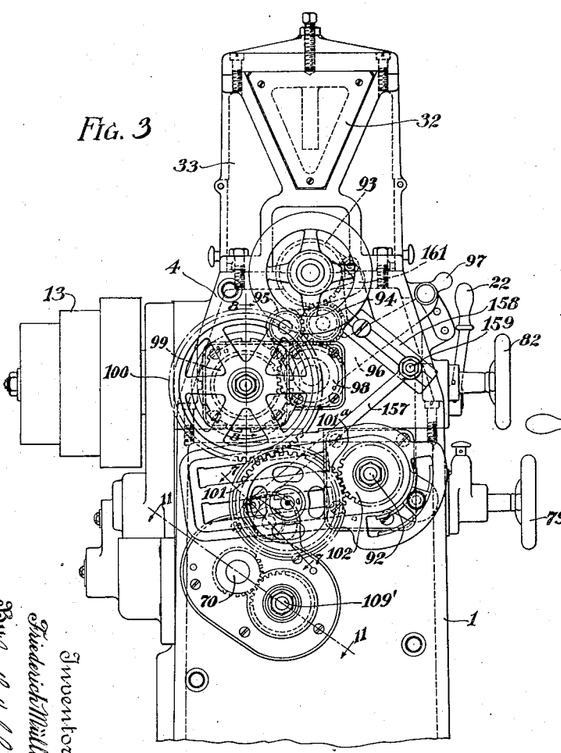
Fig. 3 is a left end elevation.
Figure 4:
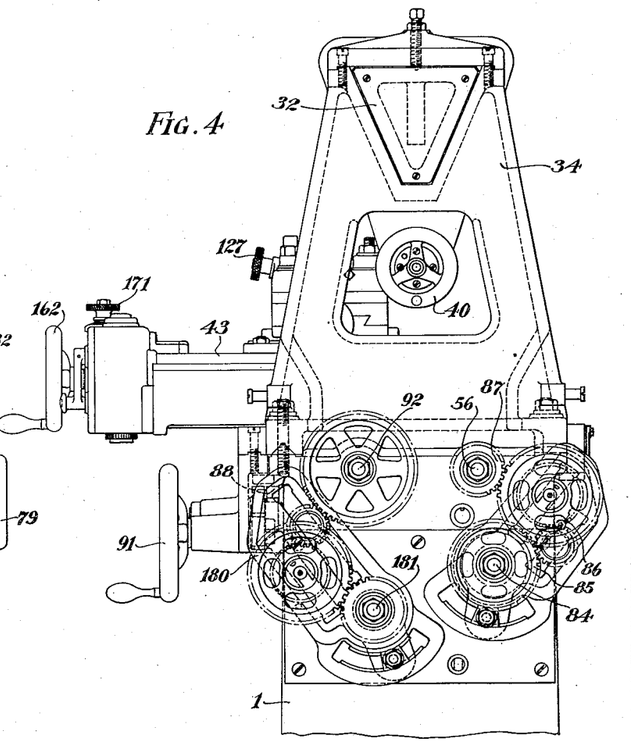
Fig. 4 is a right end elevation.

The power means for operating the carriage comprises a screw 92 operated through change speed gearing at the forward end of the machine. This mechanism is shown particularly in Figs. 2 and 3 wherein the screw is illustrated as being driven from the spindle. The gearing comprises a gear 93 secured to the spindle 7 and adapted to mesh either with a gear 94 or an idler pinion 95. The gear 94 and the idler pinion 95 are mounted on a swinging bracket 96 adapted to be controlled by the hand lever 97. By means of this lever the bracket 96 can be moved either to bring the gear 94 into mesh with the gear 93 as shown in Fig. 3 or to bring the idler pinion 95 into mesh with the gear 93, or to bring both the gear and the pinion out of mesh. From the gear 94 power is transmitted to the lead screw through the gears 98, 99, 100, 101, 101$^a$ and 102, some of which are interchangeable in the usual way to vary the rate of rotation of the lead screw with respect to that of the spindle. It will be seen that the lead screw can be entirely disconnected from the spindle or can be connected therewith for rotation in either direction. 103 illustrates a split nut mounted on the carriage and adapted to be engaged with and disengaged from the screw 92 by means of the usual cam mechanism 104 operated by a handle 105.

It will be seen that through the mechanism just described the tool carriage may be moved longitudinally of the spindle synchronously with the rotation of the spindle, such movement of the carriage being necessary when operating on a cutter having its teeth arranged with a lead similar to a screw thread. When operating on a multiple start cutter it is necessary to rotate the spindle and cutter a definite accurate amount independent of the movement of the tool carriage in order to bring each start into a definite position relative to the tool. For example, after finishing the cutting operation on one start of a two-start cutter or hob, the cutter must be rotated through 180° independent of any movement of the tool longitudinally of the cutter axis in order to bring the beginning of the second start into the proper cutting position relative to the tool. This operation may be performed by an indexing mechanism illustrated in Figs. 2, 3, 8, 9 and 10 and comprising broadly two parts 106 and 107 connected to the screw operating shaft 109 and the spindle 7 respectively. As illustrated in Figs. 8, 9 and 10, the gear 99 is keyed to a sleeve 108 loosely mounted on the shaft 109 which sleeve has a flange 110 at the end opposite the gear 99. The flange 110 is notched at diametrically opposite points 111 to receive therein lugs 112 of the part 107. The part 106 is keyed to the shaft 109 and has a flange provided with a plurality of equally spaced notches 113 into any one of which is adapted to be received a latch or lug 114 secured to the part 107 by means of a screw 115 or otherwise. It will be seen that by removing the latch 114 the two parts may be given any relative adjustment whereby the spindle is indexed relative to the tool. As illustrated, the relative size of the gears is preferably such that the angular movement given to the spindle corresponds to the angular movement of the indexing mechanism or shaft 109, the spindle being given one rotation for each rotation of shaft 109.

In operating on cutters having a fine lead or pitch the carriage screw 92 is necessarily rotated very slowly to likewise move the tool slowly longitudinally of the cutter relative to the spindle rotation, while operating on cutters having a coarse lead the screw 92 must be rotated rapidly relative to the spindle rotation. The change speed gearing from the spindle to the screw, illustrated in Figs. 2 and 3, provide such a variation within certain limits. However, in order to increase the speed range of the screw, I provide the following mechanism. In Figs. 2 and 11 is shown a shaft 109' corresponding to the shaft 109 and having loosely mounted thereon a sleeve 108'. A gear 99' is keyed to the sleeve and meshes with a gear 116 secured to the high speed shaft 70. The outer end of shafts 109 and 109' are identical and either is adapted to receive thereon the indexing mechanism 106 and 107 and gear 100, the bushing 117 shown on the shaft 109' of course being removable. It will be seen, therefore, that the screw may be given a variety of relatively slow rotative speeds from the spindle or a variety of relatively faster speeds from the high speed shaft 70. As stated above, the gearing between the shaft 109 and the spindle is preferably one to one ratio. The connection between the shaft 109' and the spindle is preferably in the ratio of ten to one, that is, the tool carriage may be given a feeding movement from the shaft 109' ten times as fast as from the shaft 109. The change speed gearing between each of these shafts and the screw permits of a wide variation of feeds between and beyond these limits. The indexing mechanism is operated in the same manner on either shaft 109 or 109'.

The cutting tool 42 can be mounted on the slide 43 in any suitable manner. However, when the slide is mounted as herein shown and described, I prefer a tool holding and supporting means which comprises a plate 118 adjustable angularly with respect to the slide and also longitudinally of the slide. The plate 118 is connected with a plate 119 having an annular beveled surface. A ring 120 having a similar beveled surface surrounds the plate 119 and is adjustably secured to the slide by means of bolts 121 engaging T-slots 122. This construction permits the plate 118 to be moved longitudinally of the slide or angularly, and when the bolts 121 are tightened the plate is locked in place. Mounted on the plate 118 is a slide 123 horizontally movable under the control of a screw 124. Mounted vertically on the slide 123 are a plurality, four being illustrated, of bolts 125. A tool-supporting member 126 is provided with a plurality of holes therein for receiving the bolts 125, the bolts and holes being symmetrically arranged whereby the support may be mounted on the slide in any one of four relatively right angular positions. The tool may be adjusted by means of a screw 127 and a strap 128 is adapted to secure the tool in place by means of two of the bolts 125. By means of this tool mounting adjustment the tool may be made to face in the direction most adapted to the particular work to be performed and the tool holder may be so mounted that the tool post operating screw 124, as well as the other tool controls, is located in the most convenient position for the operator. This adjustable mounting is particularly useful in end relieving and relieving operations wherein the tool must operate from the side of the work opposite to that illustrated. In end relieving with a tool having a lateral cutting edge thereon, it is desirable to adjust the tool carriage to a right angular position with the feed screw 124 parallel with the work spindle while leaving the tool in a right angular position relative to the spindle. The improved adjustable tool support provides for such an adjustment since the tool holder 126 may be given a quarter turn to permit this relative relation of the parts. It will also be seen that by properly adjusting the tool support the screw 124 may be made to extend in a direction convenient to the operator as well as avoiding the engagement of the headstock 4 by the end 124' of the screw when operating with the tool on the side of the work opposite to that illustrated.

Means are provided whereby the extent of the forward movements of the cutting tool may be increased as the cutter rotates, thus effecting feeding and causing the tool to take a fresh chip at each rotation of the cutter. I prefer to effect the feeding automatically and preferably the construction is such that the feeding takes place intermittently at the end of each rotation of the cutter instead of gradually.

The actuating device 58 has been described as normally movable in unison with the tool carrying slide 43. The two elements are connected by a rotatable screw 129 which has threaded engagement with the slide. The inner end of the screw extends through an aperture in the actuating device and is held against longitudinal movement with respect to the said device by means of lock nuts at 130. Mounted in the device which supports the slide 43 (in this case the turntable 44) is a short rotatable shaft 131 provided at its inner end with a clutch element 132 which is shaped to engage the end of the clutch element 133 on the screw 129 and impart rotary movement thereto. It will be understood that the clutch elements permit relative longitudinal movement, thus permitting the actuating device and the slide to reciprocate without however causing any reciprocation of the screw actuating shaft 131.

Feeding is effected by turning the shaft 131 and this is preferably accomplished automatically. Loosely mounted on the shaft is a worm wheel 134 with which meshes a worm 135. Splined to the shaft 131 is a disk 136 and interposed between the disk and the worm wheel is a friction washer. Springs are provided for causing frictional engagement at the washer, thus providing a frictional connection between the worm wheel and the shaft.

Figures 19, 20, 21, 22, 23, 24, 25:
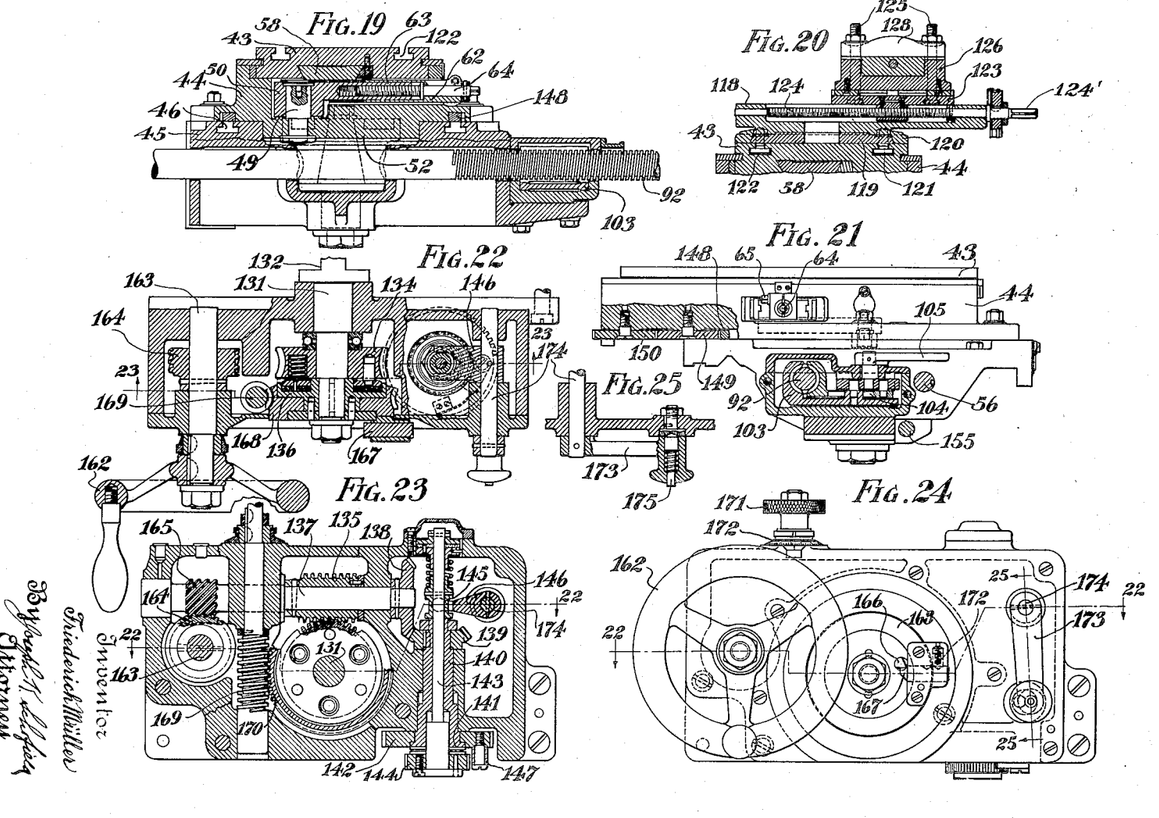
Fig. 19 is a vertical transverse sectional view taken on the line 19—19 of Fig. 15.
Fig. 20 is a vertical transverse sectional view through the tool support on the line 20—20 of Figs. 16 and 18.
Fig. 21 is a vertical transverse sectional view taken on the line 21—21 of Fig. 15, the tool carriage being shown in elevation.
Fig. 22 is an enlarged horizontal sectional view of a portion of the tool carriage taken on the line 22—22 of Figs. 23 and 24.
Fig. 23 is a vertical transverse sectional view thereof taken on the line 23—23 of Fig. 22.
Fig. 24 is a front elevation thereof.
Fig. 25 is a detail sectional view taken on the line 25—25 of Fig. 24.

The devices for rotating the worm 135 may vary with the type of machine, but in a machine of the sort illustrated, in which the slide 43 is mounted on a turntable, the following elements are preferably provided for operating the worm. As shown in Fig. 23, the worm 135 is secured to a horizontal shaft 137 mounted in suitable bearings in the turntable 44. At one end of the shaft 137 is a bevel gear 138 meshing with a bevel pinion 139 secured to a vertical bushing 140. This bushing carries at its lower end a toothed clutch element 141 upon which is rotatably mounted a gear 142. Slidably and rotatably mounted in the bushing 140 is a shaft 143 to the lower end of which is secured a ratchet wheel 144 having on its upper surface teeth adapted to mesh with the teeth of the clutch element 141. At the upper end of the shaft 143 is a grooved collar 145 into the groove of which fit projections on the forked arm of a bell-crank 146. By moving the bell-crank by means of the handle shown in Fig. 25, the shaft 143 can be raised or lowered to bring the clutch teeth on the ratchet wheel 144 into or out of engagement with the teeth on the clutch element 141. Mounted on the gear 142 is a ratchet or pawl 147 spring-pressed into engagement with the teeth of the ratchet wheel 144. By means of this pawl the ratchet wheel is rotated in the clockwise direction whenever the gear is rotated in the said direction and this motion is transmitted to the sleeve 140 and the parts connected therewith whenever the ratchet wheel is in its upper position to engage the clutch teeth.

Mounted on the turntable 44 for movement about the axis thereof, is a suitable power transmitting element, and by preference this element is in the form of an annular toothed ring 148. As shown, the ring 148 is mounted in an annular rabbet formed at the periphery of the turntable, the bottom of the ring engaging the top surface of the saddle 45. The ring is provided with teeth on its outer periphery, and the construction of the turntable is such that these teeth are exposed throughout the major portion of the periphery. Means are provided for imparting movement to the ring 148, and this movement is transmitted to the gear wheel 142 by means of idler gears 149 and 150 mounted on the turntable. Inasmuch as the ring is concentrically mounted, the power connection with the said gear 142 is maintained for all positions of the turntable. For imparting movement to the ring 148 there is preferably provided a gear wheel 151 meshing with gear teeth cut on the under side of the ring (Fig. 2). It should be understood that the ring is freely rotatably mounted in the turntable and that the peripheral teeth thereon and the teeth in the under side thereof extend only a portion of the distance around the ring, such distance being sufficient, however, for all feeding operations. As more clearly illustrated in Fig. 16, the gear 151 is driven through the gears 152, 153 and 154, the gear 154 being splined to the longitudinal feed shaft 155.

The shaft 155 is mounted in suitable bearings in the bed and is provided at one end with means for imparting movement thereto. Preferably the shaft is given an oscillatory movement and the means (Figs. 2, 3 and 7) for imparting such movement, as shown, comprises an arm 156 secured to the end of the shaft and oscillated by a link 157. Pivotally mounted on the headstock casting is a bell-crank 158, one arm of which is provided with a T-slot. A T-bolt 159 fits in the T-slot and serves as a pivot for the upper end of the rod 157. This pivot is adjustable along the arm and the amount of travel of the link as the bell-crank is oscillated can be varied from zero to maximum. Mounted on the live spindle 7 is a disk 160 provided with a cam groove 161. A roller on the bell-crank 158 fits this groove and the groove is so shaped that in at least one direction the bell-crank is given a rapid movement.

From the foregoing description it will be seen that as the live spindle is rotated the cam 161 imparts a rocking movement to the bell-crank 158, which serves to reciprocate to a greater or less extent the link 157. By means of the link and arm, oscillatory movement is transmitted to the shaft 155 and through the connections described, this movement is transmitted to the gear 142. By means of the pawl 147 the movement of the gear 142 in one direction is transmitted to the ratchet wheel 144, the pawl passing freely over the teeth of the ratchet wheel when the gear 142 moves in the other direction. When the ratchet wheel is connected with the sleeve 140 the intermittent movement thereof is transmitted to the worm wheel 134 from which, by means of the friction devices described, it is transmitted to the shaft 131 and the feed screw 129. As the movement in one direction occurs once for each revolution of the spindle and of the cutter driven thereby, the feed is effected once for each revolution of the cutter. The amount of feed at each revolution can be varied by adjusting the pivot at 159. It will be evident that this automatic feeding mechanism is ordinarily used in relieving milling cutters or hobs having the cutting teeth arranged annularly thereon. When relieving a spiral hob this feeding mechanism will ordinarily be thrown out of action.

In addition to the automatic feeding means, I preferably also provide hand operated means for controlling the tool. As illustrated, this hand controlled means comprises a hand wheel 162 mounted on a short shaft 163 on which is mounted a spiral gear 164 meshing with a spiral gear 165 on the shaft 137. Frequently in order to start the cutting it is desirable to advance the tool in the feeding direction at a speed greater than that caused by the automatic mechanism. This can be done at any time by means of the hand wheel without interfering in any way with the operative relation of the automatic mechanism. The ratchet wheel is advanced with respect to its driving pawl, the teeth of the wheel freely slipping under the pawl. Whenever the more rapid manual movement is discontinued, the movement by means of the pawl is resumed as before. In case it is desired to move the tool backward the ratchet wheel is disconnected by means of the bell-crank 146, thus placing the tool entirely under the control of the hand wheel.

For automatic feeding it is preferable to provide means whereby the feeding is automatically stopped at a predetermined limit. My improved stop mechanism provided herein is most clearly shown in Figs. 22, 23 and 24. I provide a stop 166 on the outer face of a disk secured to the disk member 136. I provide a second stop 167 adjustable in the path of movement of the first stop, such second stop preferably being mounted on the member 168 loosely mounted on the disk member 136. As a means for rotatably adjusting the member 168, I provide a worm 169 meshing with worm teeth 170 on the said member. The worm shaft extends outwardly of the casing and is provided with a knob 171 for rotating the same. An index dial 172 is secured to the shaft whereby the member 168, and therefore the stop 167, may be accurately set to stop the feed at the desired point. By suitably adjusting the stop 167 with respect to the stop 166 the latter engages the former and is stopped thereby after feeding has taken place to the desired extent. It will be seen that as the first stop engages the second stop, further movement of the shaft 131 and of the feed screw is prevented, the friction elements permitting the worm to continue to turn as before.

When the tool is to be controlled manually, it is desirable to prevent the engagement of the stops. For this purpose a spring-pressed latch 172 engages the stop 167 whereby the stop may be held out of the path of movement of the stop 166 when desired. A handle 173 (Fig. 25) is provided on the shaft 174 for operating the bell-crank 146 to disengage the clutch element 141. A spring-pressed detent 175 within the handle serves to hold the clutch in either of its two positions.

In addition to forming part of the automatic stop mechanism the friction elements described also serve to prevent injury to the machine in case the normal feeding operation is interfered with in any way. In the case of any abnormal resistance to feeding, the friction elements will slip and no harm will result.

When performing relieving operations on a cutter or hob having straight longitudinal flutes parallel with the cutter axis and wherein the cutting edge of each of the several teeth along any one flute is in the same angular position on the cutter, the angular starting position of the tool relative to the cutter is the same for each successive tooth along any one flute. However, when operating on a cutter or hob having its flutes cut spirally therein and the cutting edge of each successive tooth along any one flute therefore being arranged spirally around the cutter, it will be seen that the angular starting position of the tool relative to the cutter is slightly in advance or retard for each successive tooth along any one flute. It is therefore essential when operating on this latter form of cutter that the operative position of the tool be slightly advanced or retarded as the tool carriage moves longitudinally along the cutter. The compensating mechanism heretofore referred to and particularly shown in Figs. 12, 13 and 14 of the drawings is adapted to perform this function. Referring particularly to Figs. 2, 4, 12, 13 and 14, it will be seen that the shaft 56 which controls the tool in performing its relieving operations is driven from the high speed shaft 70 through the differential gearing 83 and the change speed mechanism 86. The differential gearing comprises a bevel gear 176 fast on shaft 70, two bevel gears rotatably mounted on a hub 177 keyed to the shaft 84 and a bevel gear 178 integral with a worm wheel 179 mounted loosely on the shaft 84. As illustrated, the bevel gear 178 and worm wheel 179 are adapted to be driven from the screw 92 through change speed gearing 180, shaft 181, bevel gears 182 and worm shaft 183 having a worm thereon meshing with the worm wheel 179.

As above stated, when relieving cutters having straight longitudinal flutes the angular starting position of the tool relative to the cutter is the same for each successive tooth along any one flute. During such operation no retarding or advancing movement of the tool is required and therefore the change speed gearing is disconnected from the screw, and the worm wheel 179 and bevel gear 178 are therefore held against rotation. Under such condition it will be seen that the rotation of shaft 70 rotates the bevel gear 176 which rotates the bevel gears on the hub 177 over the stationary gear 178 whereby the hub 177 and shaft 84 are rotated in the same direction and at the same angular speed as the shaft 70. The position of the tool relative to the angular position of the cutter or hob is therefore the same regardless of the position of the tool carriage along the cutter.

When relieving cutters having flutes arranged spirally therein the cutting position of the tool is slightly retarded or advanced as the tool carriage moves longitudinally along the cutter to allow for the slightly different angular position of each successive tooth relative to the cutter. In operation, the bevel gear 178 is given a slight rotation from the tool carriage operating screw 92 as the carriage is advanced along the cutter, the direction of rotation and the speed of the gear 178 being controlled through the change speed gearing 180. It will be clear from Fig. 14 that the rotation of the shaft 84 and therefore the relieving operation of the tool relative to the rotation of the shaft 70 is varied directly by the rotation of gear 178. Also the gear 178 is operated synchronously with the longitudinal movement of the carriage since both are operated from the screw 92. It will therefore be seen that during the relieving operation of the tool, the tool is advanced or retarded synchronously with the longitudinal advancing movement of the carriage.

What I claim is:

1. In a lathe, the combination of a work supporting and driving spindle, a drive shaft operatively connected to the spindle to rotate the latter at a reduced speed, a tool supporting carriage, a screw for moving the carriage longitudinally of the spindle, two shafts parallel with and adjacent the screw, means for driving one shaft relatively slowly from the spindle, means for driving the other shaft relatively fast from the drive shaft independently of the spindle, and change speed gearing adapted to operatively connect the screw to either of said shafts.

2. In a lathe, the combination of a work supporting and driving spindle, a drive shaft operatively connected to the spindle to rotate the latter at a reduced speed, a tool supporting carriage, a screw for moving the carriage longitudinally of the spindle, one end of the screw projecting outwardly of the lathe, two shafts substantially equally spaced from the said screw end and projecting outwardly of the lathe, means for driving one shaft relatively slowly from the spindle, means for driving the other shaft relatively fast from the drive shaft independently of the spindle, and change speed gearing adapted to operatively connect the projecting end of the screw with either of said shafts.

3. In a relieving lathe, the combination of a work supporting and driving spindle, a tool-supporting carriage, a screw for moving the carriage longitudinally of the spindle, a relatively high speed shaft for controlling the relieving operation of the tool, and means whereby the screw may be driven either from the spindle or from the high speed shaft through other mechanism independently of the spindle.

4. In a relieving lathe, the combination of a work supporting and driving spindle, a tool-supporting carriage, a screw for moving the carriage longitudinally of the spindle, a relatively high speed shaft for controlling the relieving operation of the tool, and means including two shafts adjacent the screw and driven from the spindle and high speed shaft through other mechanism independently of the spindle respectively, whereby the screw may be driven either from the spindle or from the high speed shaft, the screw being adapted to be connected with either of the said shafts through change speed gearing.

5. In a lathe, the combination of a work supporting and driving spindle, a tool-supporting carriage, a screw for moving the carriage longitudinally of the spindle, a relatively slow and a relatively fast screw driving means synchronously connected with the spindle, and an indexing mechanism adapted to be mounted on either of the said two means, the spindle and either of the said two means and the screw being adapted to be relatively indexed through the indexing mechanism.

6. In a lathe, the combination of a work supporting and driving spindle, a tool-supporting carriage, a screw for moving the carriage longitudinally of the spindle, means comprising a relatively slow and a relatively fast shaft synchronously connected with the spindle and adjacent the screw, the screw being adapted to be connected with either of the said shafts through change speed gearing, a two-part indexing mechanism adapted to be mounted on either of the said two shafts, one part being adapted to be operatively connected to the screw through the change speed gearing and the other part to the shaft on which it is mounted, and means for securing such parts together in any one of a plurality of relatively angular positions to relatively index the shaft and screw.

7. In a lathe, the combination of a work supporting and driving spindle, a drive shaft operatively connected to the spindle to rotate the latter at a reduced speed, a tool-supporting carriage, a screw for moving the carriage longitudinally of the spindle, means comprising two shafts adjacent the screw and driven from the spindle and drive shaft respectively whereby the screw may either be driven relatively slow from the spindle or relatively fast from the drive shaft, the screw being adapted to be connected with either of the said shafts through change speed gearing, a two-part indexing mechanism adapted to be mounted on either of the said two shafts, one part being adapted to be operatively connected to the screw through the change speed gearing and the other part to the shaft on which it is mounted, and a latch for securing such parts together in any one of a plurality of relatively angular positions to relatively index the shaft and screw.

8. In a relieving lathe, the combination of a work supporting and driving spindle, a tool holder, a shaft adapted to reciprocate the tool holder toward and from the work to effect relieving, a synchronous operative connection between the shaft and spindle, a manually operable element, and means adapted to be operated by the element to disengage such connection and effect a relative rotative movement between the spindle and shaft.

9. In a relieving lathe, the combination of a work supporting and driving spindle, a tool holder, a shaft adapted to reciprocate the tool holder toward and from the work to effect relieving, a synchronous operative connection between the shaft and spindle, a manually operable element, means adapted to be operated by the element to disengage such connection and effect a relative rotative movement between the spindle and shaft, and a spring-pressed latch for holding the last named means in its engaged position.

10. In a relieving lathe, the combination of a work supporting and driving spindle, a tool holder, a shaft adapted to reciprocate the tool holder toward and from the work to effect relieving, a synchronous operative connection between the shaft and spindle, and means comprising a sliding gear and a hand wheel operatively connected thereto whereby such connection may be disengaged and a relative rotative movement effected between the spindle and shaft, the hand wheel being adapted to effect both the disengaging movement and the rotative movement.

11. In a relieving lathe, the combination of a work supporting and driving spindle, a tool holder, a shaft adapted to reciprocate the tool holder toward and from the work to effect relieving, a synchronous operative connection comprising a plurality of gears between the shaft and spindle, one of such gears being mounted on a longitudinally adjustable shaft whereby such gear may be disengaged from one of its companion gears, and a hand wheel on the shaft for shifting the shaft and gear axially to the disengaged position and for rotating the shaft and the gearing connected therewith whereby a relative rotative movement is effected between the spindle and shaft.

12. In a tool feeding mechanism, the combination of a tool holder, a feed screw operatively connected thereto, a stop connected to the feed screw, screw rotating means frictionally connected to the stop, a worm wheel loosely mounted coaxially of the screw, a stop on the worm wheel in the path of movement of the first stop, and a worm engaging the worm wheel to place the second stop in any desired position relative to the first stop whereby to stop the feed of the tool at the desired point, the said frictional connection permitting the stopping of the screw though the screw rotating means continues to operate.

13. In a relieving lathe, the combination of means for holding and rotating a cutter, a tool carriage, a tool holder mounted on the carriage, means for moving the tool holder toward and away from the cutter in timed relation to the rotation thereof, a device for giving the tool holder a feeding movement supplemental to the aforesaid normal movements, automatic means for operating the feeding device, means for preventing the operation of the feeding device by the said automatic means after feeding has taken place to a predetermined extent, and means including a shaft mounted in the carriage for adjusting the last named means to vary the extent of feed.

14. In a relieving lathe, the combination of means for holding and rotating a cutter, a tool carriage, a tool holder mounted on the carriage, means for moving the tool holder toward and away from the cutter in timed relation to the rotation thereof, a device for giving the tool holder a feeding movement supplemental to the aforesaid normal movements, automatic means for operating the feeding device, and means comprising a pair of stops for preventing the operation of the feeding device by the said automatic means after feeding has taken place to a predetermined extent, one stop being connected to the screw and the other stop being adjustably mounted in the path of movement of the first stop.

15. In a relieving lathe, the combination of means for holding and rotating a cutter, a tool carriage, a tool holder mounted on the carriage, means for moving the tool holder toward and away from the cutter in timed relation to the rotation thereof, a device for giving the tool holder a feeding movement supplemental to the aforesaid normal movements, automatic means for operating the feeding device, and means comprising a pair of stops for preventing the operation of the feeding device by the said automatic means after feeding has taken place to a predetermined extent, one stop being frictionally connected to the screw operating means and the other stop being adjustably mounted in the path of movement of the first stop.

16. In a relieving lathe, the combination of means for holding and rotating a cutter, a tool carriage, a tool holder mounted on the carriage, means for moving the tool holder toward and away from the cutter in timed relation to the rotation thereof, a device for giving the tool holder a feeding movement supplemental to the aforesaid normal movements, automatic means for operating the feeding device, means comprising a pair of stops for preventing the operation of the feeding device by the said automatic means after feeding has taken place to a predetermined extent, one stop being rigidly connected to the screw and frictionally connected to the screw operating means and the other stop being adjustably mounted in the path of movement of the first stop, and means removed from the stops and mounted on the carriage for adjusting the second stop.

17. In a relieving lathe, the combination of a work supporting and driving spindle, a tool-supporting carriage, a screw for moving the carriage longitudinally of the spindle, means for controlling the relieving operation of the tool, a compensating mechanism operatively connected with the screw and the relieving means and adapted to slightly retard or advance the relieving position of the tool as the tool carriage is moved longitudinally along the work, tool feeding mechanism adapted to automatically feed the tool intermittently at predetermined intervals in the rotation of the work, and means for rendering either of the said mechanisms operative or inoperative.

18. In a relieving lathe, the combination of a work supporting and driving spindle, a tool-supporting carriage, a screw for moving the carriage longitudinally of the spindle, a relatively high speed shaft for controlling the relieving operation of the tool, a differential compensating mechanism operatively connected with the screw and the shaft and adapted to slightly retard or advance the relieving position of the tool as the tool carriage is moved longitudinally along the work, tool feeding mechanism adapted to automatically feed the tool once during each rotation of the work, and means for rendering either of the said mechanisms operative or inoperative.

19. In a relieving lathe, the combination of a work supporting and driving spindle, a tool-supporting carriage, a screw for moving the carriage longitudinally of the spindle, a relatively high speed shaft for controlling the relieveing operation of the tool, a differential compensating mechanism in the tool operating connection through the shaft, the screw being operatively connected to a portion of the differential mechanism, change gears for varying the amount of differential action of the compensating mechanism, the compensating mechanism being adapted to slightly retard or advance the relieving position of the tool as the tool carriage is moved longitudinally along the work, tool feeding mechanism adapted to automatically feed the tool intermittently during the rotation of the work, and means for rendering either of the said mechanisms operative or inoperative.

20. A tool support comprising the combination of a base, a plurality of bolts mounted in the base and projecting in a relatively parallel direction therefrom, and a tool-supporting block having a plurality of holes therein for receiving the said bolts, the block being adapted to be mounted on the base in any one of a plurality of angular positions.

21. A tool support comprising the combination of a base, a plurality of bolts mounted symmetrically on the base and projecting in a relatively parallel direction therefrom, and a tool-supporting block having a plurality of holes therein corresponding in number and relative location to the bolts in the base, the block being adapted to be mounted on the base in as many angular positions as there are bolts in the base with each bolt entering a hole in the block.

22. A tool support comprising the combination of a base, four bolts mounted in the base and projecting in a relatively parallel direction therefrom, and a tool-supporting block having four holes therein corresponding in location to the bolts in the base, the block being adapted to be mounted on the base in any one of four relatively right angular positions with each bolt entering a hole in the block.

23. A tool support comprising the combination of a base, four bolts mounted in the base and projecting in a relatively parallel direction therefrom, a tool-supporting block having four holes therein corresponding in location to the bolts in the base, the block being adapted to be mounted on the base in any one of four relatively right angular positions with each bolt entering a hole in the block, and a tool-securing strap adapted to clamp the tool in position on the block by means of two of the said bolts.

In testimony whereof, I hereto affix my signature.

FRIEDERICH MÜLLER.